United States Patent [19]

Hirano

[11] Patent Number: 4,757,557

[45] Date of Patent: Jul. 19, 1988

[54] MULTICOLORED GAUNTLET WITH DESIGN SEAL OR SEALS AND METHOD FOR PRODUCING SAME

[76] Inventor: Kihachiro Hirano, 2-3-26 Koishikawa, Bunkyo-ku, Tokyo, Japan

[21] Appl. No.: 58,885

[22] Filed: Jun. 5, 1987

[30] Foreign Application Priority Data

Jun. 17, 1986 [JP] Japan .................. 61-141142

[51] Int. Cl.⁴ ........................................... A41D 19/00
[52] U.S. Cl. ............................................. 2/168; 2/164
[58] Field of Search ................. 2/168, 169, 162, 164, 2/167

[56] References Cited

U.S. PATENT DOCUMENTS

| | | | |
|---|---|---|---|
| 2,120,722 | 6/1938 | Tillotson | 2/168 X |
| 2,873,450 | 2/1959 | Brodeur | 2/168 X |
| 4,133,624 | 1/1979 | Heavner et al. | 2/168 X |
| 4,464,796 | 8/1984 | Heissenberger et al. | 2/162 X |
| 4,536,890 | 8/1985 | Barnett et al. | 2/168 X |

FOREIGN PATENT DOCUMENTS

| | | |
|---|---|---|
| 59-2084 | 1/1984 | Japan . |
| 59-38408 | 10/1984 | Japan . |
| 59-40410 | 11/1984 | Japan . |
| 60-14724 | 5/1985 | Japan . |

Primary Examiner—Louis K. Rimrodt
Assistant Examiner—J. L. Olds
Attorney, Agent, or Firm—Wenderoth, Lind & Ponack

[57] ABSTRACT

There is provided a multicolored gauntlet with at one design seal applied to the inner surface of a selected area of the gauntlet. The gauntlet having three different color portions. The multicolored gauntlet is prepared by partially immersing a mold into a body of transparent or translucent resin to form a main body of the gauntlet on the mold, after the removal of the mold from the resin, applying at least one design seal to a selected area of the main body, partially immersing the mold into a body of colored adhesive to color a portion of the main body, after the removal of the mold from the colored adhesive, applying a paste layer to a substantial portion of the main body including the selected area and colored portion and flocking fibers on the paste layer.

3 Claims, 1 Drawing Sheet

U.S. Patent  Jul. 19, 1988  4,757,557
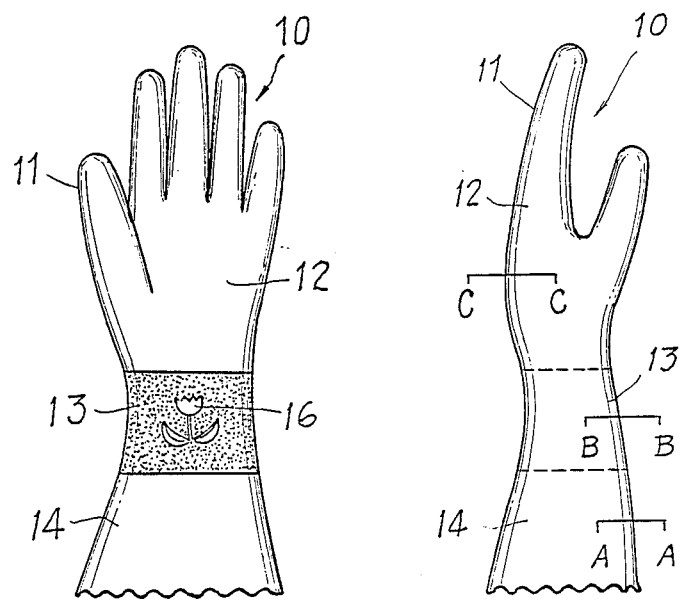
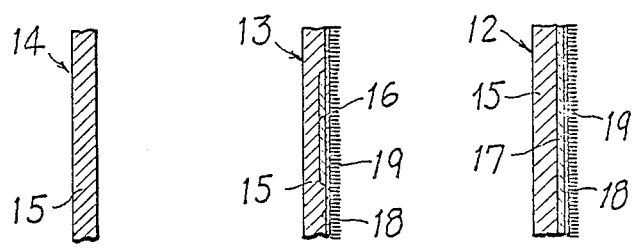

MULTICOLORED GAUNTLET WITH DESIGN SEAL OR SEALS AND METHOD FOR PRODUCING SAME

BACKGROUND OF THE INVENTION

This invention relates to a multicolored synthetic resin or rubber domestic gauntlet with a design seal to be used in washing and cooking and a method for producing the gauntlet.

One object of the present invention is to provide a multicolored synthetic resin or rubber domestic gauntlet comprising a two- or three-colored main body which includes different color portions and has at least one design seal bearing an animal or animals, a flower or flowers and/or an advertisement letter or letters attached to the inner surface of the main body and a method for producing the gauntlet.

There have been proposed and practically employed a variety of synthetic resin or rubber domestic gauntlets having design seals attached thereto. The prior art synthetic resin or rubber domestic gauntlets having design seals attached thereto are generally produced by forming a thin transparent main body film having a thickness on the order of 0.01 to 0.03 mm from transparent vinyl chloride or rubber and manually applying a paper design seal having a design printed thereon to the external surface of the main body or mechanically transferring a transfer tape bearing a desin onto the transparent thin film main sheet. And in the coloring of the gauntlet, a coloring matter or matters are blended in the material for the main body. However, the prior art gauntlet having the design printed paper seal applied to the external surface of the gauntlet main body has the drawbacks that the seal easily comes off the main body after frequent use of the gauntlet and that there occurs a difference in level between the main body and seal and as a result, the material of the main body tends to tear at the area surrounding the seal. The mechanical transfer of the seal requires an expensive facility of such complicated construction that a trouble or troubles may occur.

Since the colored gauntlet of the above type has the main body formed of synthetic resin or rubber which has a coloring matter blended therein, the gauntlet presents a monotonous appearance and the seal is not distinctly displayed.

SUMMARY OF THE INVENTION

Therefore, the present invention has its object to provide a novel and improved multicolored gauntlet with a design seal or seals which eliminates the drawbacks inherent in the prior art multicolored gauntlets with a design seal or seals referred to hereinabove and another object of the present invention is to provide a method for producing the novel and improved multicolored gauntlet with a design seal or seals.

According to the present invention, since the design seal or seals are applied to the inner surface of the transparent or translucent main body and covered by a flock layer, the seal or seals are protected against rubbing off the main body as a result of frequent use of the gauntlet and can be clearly seen on the external surface of the main body through the transparency of the material of the main body for a long period of time. And since the main body is formed of a light color transparent or translucent sheet, a portion of the main body is colored by a colored adhesive having a color thicker than that of the main body and the inner surface of the main body is covered by a flock layer except for a portion, the obtained gauntlet has a pleasing multicolor appearance.

According to one aspect of the present invention, there is provided a multicolored gauntlet with at least one design seal which comprises a pliable multicolored main body formed of a thin sheet of transparent or translucent natural rubber, synthetic resin or synthetic rubber and including a hand portion, a first half wrist portion having a color lighter than the color of said hand portion and a second half wrist portion having a color lighter than the color of said first half wrist portion; at least one design seal applied to said first wrist portion; a paste layer applied to said hand portion, first half wrist portion and design seal; and a flock layer applied to said paste layer.

According to another aspect of the present invention, there is provided a method for producing a multicolored gauntlet with at least one design seal which comprises the steps of partially immersing a metal or ceramic gauntlet forming mold having a configuration corresponding to said gauntlet to be produced into a body of light color transparent or translucent vinyl chloride resin sol to deposit a portion of said resin on said mold; after the removal of said mold out of said body of the resin, heating said mold to gel said resin and then allowing the resin to partially solidify to form a gauntlet main body core sheet having first, second and third portions; while said resin in the gelled state, applying a colored design seal to said second portion of the core sheet; cooling said mold to solidify said core sheet; partially immersing said mold into a body or a colored rubber or vinyl adhesive solution having a color different from the color of said main body core sheet so as to form a film of the colored adhesive on only said first portion of the main body; after the removal of said mold out of said body of the adhesive solution, applying a flocking adhesive paste to said colored first portion and said second portion of the main body core sheet to deposit a flocking adhesive paste layer on the two positions and flocking fibers on said paste layer to form an assembly; heating and then cooling said mold; and removing said assembly from said mold as to turn inside out to thereby produce said multicolored gauntlet with at least one design seal.

The above and other objects and attendant advantages of the present invention will be more readily apparent to those skilled in the art from a reading of the following detailed description referring to the accompanying drawing which shows a preferred embodiment of the invention for illustration purpose only, but not for limiting the scope of the same in any way.

BRIEF DESCRIPTION OF THE DRAWING

FIG. 1 is a plan view of the multi-colored gauntlet embodying the principle of the present invention showing the palm side of the gauntlet;

FIG. 2 is a side view of the gauntlet of FIG. 1;

FIG. 3 is a cross-sectional view on an enlarged scale taken along the line A—A of FIG. 2;

FIG. 4 is a cross-sectional view on an enlarged scale taken along the line B—B of FIG. 2; and FIG. 5 is a cross sectional view on an enlarged scale taken along the line C—C of FIG. 2.

PREFERRED EMBODIMENT OF THE INVENTION

The present invention will be now described referring to the accompanying drawing wherein the multicolored gauntlet embodying the present invention is illustrated.

The gauntlet is generally shown by reference numeral 10 and comprises a pliable multicolored main body 11 first formed of a thin sheet of light color transparent or translucent natural rubber, synthetic rubber or synthetic resin. The main body 11 integrally comprises a colored hand portion 12, a first half wrist portion 13 having a color lighter than that of the hand portion 12 and a second half wrist portion 14 having a color lighter than the color of the first half wrist portion 13.

The gauntlet 10 is prepared by immersing a gauntlet forming mold having a configuration corresponding to the configuration of a gauntlet to be produced into a body of light color transparent or translucent vinyl chloride resin sol, for example, to deposit a portion of the resin on the mold, after the removal of the mold from the body of the resin sol, gelling the resin on the mold by heating to form a gauntlet main or core sheet 15 (a portion of the core sheet is shown in FIG. 3), while the core sheet 15 is in its gelled condition, applying a rubber or vinyl film design seal 16 having a multicolor animal or animals, a flower or flowers and/or a letter or letters printed thereon to the external surface of the portion of the core sheet 15 corresponding to the first wrist portion 13 of the main body 11 of the obtained gauntlet 10, applying a colored adhesive 17 to the external surface of the portion of the core sheet 15 corresponding to the hand portion 12 of the main body 11 of the obtained gauntlet 10 to color the hand portion (FIG. 5), drying the adhesive 17, applying a paste 18 to the external surface of the portion of the core sheet 15 corresponding to the hand portion 12 and the first wrist portion 13 of the main body 11 of the obtained gauntlet 10 (FIG. 5) and then flocking colorless or colored fibers 19 to the paste layer 18 (FIGS. 4 and 5).

Now, the method for producing the multicolored gauntlet 10 with the design seal attached thereto of the present invention will be described. First of all, a metal or ceramic gauntlet forming mold (not shown) is immersed into a body of light color transparent or translucent vinyl chloride resin sol to deposit a portion of the resin on the mold and the mold having the resin deposited thereon is taken out of the resin sol body. The mold is heated to gel the resin to partially solidify to thereby form a gauntlet core sheet 15 which constitutes the main body 11 of the produced gauntlet 10. The mold is then heated to gel the resin and while the external surface of the resin core sheet 15 is in its gelled state, a seal or seals 16 having a colored animal or animals, a flower or flowers and/or a letter or letters printed thereon is applied under pressure to a desired area or areas of the core sheet 15. The seal or seals 16 may be applied to the back, wrist and/or palm of the gauntlet to be produced, for example. The seal 16 may be prepared by printing an animal or animals, a flower or flowers and/or a letter or letters on a film of rubber or the same resin as that of the core sheet 15 of indefinite length and cutting the film to a desired size.

After the application of the design seal or seals, the mold is cooled and then partially immersed into a body of a colored rubber or vinyl adhesive solution having a color different from or thicker than that of the core sheet 15 so as to form a film of the adhesive 17 on only the portion of the core sheet 15 corresponding to the hand portion 12 of the main body 11 to thereby form the hand portion 12 of the produced gauntlet 10.

Then, the portions of the core sheet 15 corresponding to the hand and first half wrist portions 12 and 13 of the main body 11 are immersed into a flocking adhesive paste to deposit a paste layer 18 thereon and colorless or colored fibers are flocked on the paste layer 18 to form a flock layer 19 to thereby produce the gauntlet 10 including the hand portion 12, first half wrist portion 13 and seconed half wrist portion 14 as shown in FIG. 1. Thus, the produced gauntlet 10 includes the three distinctively demarcated portions. After the flocking of fibers, the mold is heated and then cooled to thereby produce the desired gauntlet 10. Thereafter, the produced gauntlet 10 is removed from the forming mold as to turn inside out so that the design on the seal or seals 16 are disposed on the inner side of the gauntlet not to be rubbed off by the gauntlet wearer and seen through the light color transparent and translucent core sheet 15. In this way, according to the present invention, there is provided a pleasing multicolored domestic gauntlet which includes the colored hand portion 12, the first half wrist portion 13 having a color different from the color of the hand portion 12 and the second lighter color transparent or translucent half wrist portion 14 distinctive from the hand and first half wrist portions on the inside of the gauntlet and the design can be seen on the external surface of the gauntlet 10 through the transparent or translucent core sheet 15 on the first half wrist portion 13.

In this way, according to the present invention, while eliminating the drawbacks that the printed design seal applied to the external surface of the core sheet fades and/or is easily peeled and/or rubbed off the core sheet as experienced in the conventional domestic gauntlets with seals, the design on the inner surface of the gauntlet of the invention can be clearly seen on the external surface of the gauntlet through the material of the core sheet and can maintain its pleasant appearance for a long time period. In addition, when the colors for the transparent or translucent vinyl chloride sol forming the core sheet 15, for the colored rubber or vinyl adhesive to be applied to the hand portion and for the paste to be applied to both the hand and first half wrist portions are suitably selected, the gauntlet can be produced in various color arrangements as desired. As described hereinabove, after the immersion of the forming mold into the body of light color transparent or translucent vinyl chloride resin to deposit the resin on the mold so as to form the core sheet, when the mold is heated to gel the resin and the synthetic rubber or vinyl film design seal is applied to a selected area of the core sheet under pressure while the resin is in the gelled state, the seal can be positively attached to the core sheet and can be clearly seen on the external surface of the transparent or translucent resin of the core sheet. In addition, even the wearer pulls or stretches the gauntlet as the wearer gets in and out of the gauntlet, the material at the area of the gauntlet surrounding the seal would not easily tear. Furthermore, since the hand portion of the gauntlet is immersed into the colored adhesive solution having a color different from or thicker than that of the core sheet to be colored, the hand portion of the gauntlet main body can be clearly distinguished from the first and second half wrist portions of the gauntlet and the first and second wrist portions can be also distinguished from each other by the presence of the flock layer on the inner surface of the first half wrist portion. Furthermore, since the hand portion and the first half wrist portion are applied thereto the colored adhesive having a color different from that of the core sheet and the fibers are flocked to the adhesive layer, the combined colors of the first half wrist portion and of the flocked fibers make the first half wrist portion of the obtained gauntlet clearly distinguishable from the hand and second wrist portions of the gauntlet to thereby give an aesthetic appearance to the obtained gauntlet.

Still furthermore, according to the present invention, since the hand portion of the main body consists of the core sheet, colored adhesive layer and flock layer, the hand portion which is more abused than the rest of the gauntlet is sufficiently reinforced to give a long service life to the gauntlet. And since the design seal is interposed between the transparent or translucent core sheet and flock layer, the seal can be sufficiently protected against abrasion and rubbing by the wearer's hand. The flock layer on the inner surface of the gauntlet gives comfortable and soft feeling to the wearer's hand. Since the second half wrist portion is neither colored nor flocked, the second wrist portion has the color of the transparent or translucent core sheet.

While the present invention has been particularly shown and described with the preferred embodiment thereof, it will be understood by those skilled in the art that various changes in form and details may be made therein without departing from the spirit and scope of the invention.

What is claimed is:

1. A multicolored gauntlet with at least one design seal comprising a pliable multicolored main body formed of a thin sheet of transparent or translucent natural rubber, synthetic resin or synthetic rubber and including a colored hand portion, a first half wrist portion having a color lighter than the color of said hand portion and a second half wrist portion having a color lighter than the color of said first half wrist portion; at least one design seal applied to the inner surface of said first half wrist portion; a paste layer applied to the inner surfaces of said hand portion, first half wrist portion and design seal; and a flock layer applied to said paste layer.

2. A method for producing a multicolored gauntlet with at least one design seal comprising the steps of partially immersing a metal or ceramic gauntlet forming mold having a configuration corresponding to said gauntlet to be produced into a body of light color transparent or translucent vinyl chloride resin sol to deposit a portion of said resin on said mold, after the removal of said mold out of said body of the resin, heating said mold to gel said resin and then allowing the resin to partially solidify so as to form a gauntlet main body core sheet having first, second and third portions; while said resin is in said gelled state, applying a colored design seal to said second portion of the main body core sheet; cooling said mold; partially immersing said mold into a body of a colored rubber of vinyl adhesive solution having a color different from the color of said main body core sheet so as to color only said first portion of the main body core sheet; after the removal of said mold out of said body of adhesive solution, applying a flocking adhesive paste to said first and second portions of the main body core sheet to deposit a paste layer on said first and second main body core sheet portions; flocking fibers on said paste layer to form an assembly; heating and then cooling the mold; and removing said assembly from said mold so as to turn inside out to thereby produce said multicolored gauntlet with at least one design seal.

3. The method as set forth in claim 2, wherein said first, second and third portions are the hand, first half wrist portion and second half wrist portion of said multicolored gauntlet.

* * * * *